(12) United States Patent
Okamori

(10) Patent No.: US 8,083,307 B2
(45) Date of Patent: Dec. 27, 2011

(54) METHOD OF FABRICATING THREE-DIMENSIONAL STRUCTURE AND METHOD OF MANUFACTURING SUBSTRATE WITH SPACER

(75) Inventor: Kazuaki Okamori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 392 days.

(21) Appl. No.: 12/382,216

(22) Filed: Mar. 11, 2009

(65) Prior Publication Data
US 2009/0244126 A1 Oct. 1, 2009

(30) Foreign Application Priority Data
Mar. 31, 2008 (JP) ................................. 2008-094342

(51) Int. Cl.
*B41J 29/38* (2006.01)
*G02F 1/1339* (2006.01)
(52) U.S. Cl. ................... 347/5; 347/9; 349/155
(58) Field of Classification Search .................. 347/5, 9, 347/12, 15; 349/155
See application file for complete search history.

(56) References Cited

U.S. PATENT DOCUMENTS
6,501,527 B1 12/2002 Hirose et al.

FOREIGN PATENT DOCUMENTS
| JP | 2001-083528 | 3/2001 |
| JP | 2005-066530 | 3/2005 |
| JP | 2005-205670 | 8/2005 |

*Primary Examiner* — Lam S Nguyen
(74) *Attorney, Agent, or Firm* — Jean C. Edwards, Esq.; Edwards Neils PLLC

(57) ABSTRACT

A method of fabricating a three-dimensional structure, the method comprises the steps of: depositing a droplet of curable ink on a substrate; curing the ink deposited on the substrate; and building up the ink in layers by repeatedly depositing a droplet of curable ink on the cured ink and curing the deposited ink, while doing at least one of a control of a contact angle between the droplet of ink to be deposited and cured ink at the landing position where the droplet of ink is to be deposited and a control of a volume of the droplet of ink to be deposited so as to satisfy the condition $d_n \leq d_{n-1}$, where $d_n$ represents the landing diameter of a droplet of ink to be deposited and $d_{n-1}$ represents the diameter of cured ink at a landing position where the droplet of ink is to be deposited.

11 Claims, 6 Drawing Sheets

METHOD OF FABRICATING THREE-DIMENSIONAL STRUCTURE AND METHOD OF MANUFACTURING SUBSTRATE WITH SPACER

CROSS-REFERENCE TO RELATED APPLICATIONS

The present application claims priority from Japanese Patent Application No. 2008-094342, filed Mar. 31, 2008, the contents of which are herein incorporated by reference in their entirety.

BACKGROUND OF THE INVENTION

The present invention relates to a method of fabricating a three-dimensional structure by using an inkjet system to deposit droplets of a curable ink and build up the ink in layers. The invention also relates to a method of manufacturing a substrate having a spacer thereon using such a three-dimensional structure fabricating method.

One way to fabricate three-dimensional structures involves, by means of an inkjet system, delivering as droplets (such as by ejection) an ink having curability (referred to below simply as "ink"), causing the ink droplets to land in a predetermined pattern on a substrate and curing the deposited ink so as to form a layer of cured ink, then causing droplets of ink to be delivered and land on the resulting layer in a different predetermined pattern and curing the freshly deposited ink so as to create a different layer. By repeating these operations, a three-dimensional structure built up from layers of cured ink is created.

For example, JP 2005-205670 A discloses a three-dimensional object-forming apparatus having an ink head which ejects a UV-curable ink onto a smooth-surfaced member serving as a reference plane, a laser head which irradiates the UV-curable ink ejected from the ink head with a beam of ultraviolet light and thereby cures the ink, and a controlling means which carries out control by moving the ink head, the laser head and the smooth-surfaced member so as to build up layers of the ink on the smooth-surfaced member.

The three-dimensional structure-forming apparatus disclosed in JP 2005-205670 A is described as adjusting the dispersion of the ink and the thickness of the ink film by both adjusting the interval between the ink head and the laser head and also adjusting the period of time from when the UV-curable ink is ejected until laser irradiation is begun.

JP 2005-66530 A discloses a patterning apparatus which ejects droplets of liquid from nozzle orifices at a given period and irradiates the ejected droplets with pulsed light at times other than the period of time from just before to just after other droplets are ejected from the nozzle orifices. Providing a patterning apparatus with such a configuration is described as making it possible to form patterns having a high aspect ratio without a loss in adhesion, while at the same time preventing the nozzle orifices from clogging.

JP 2001-83528 A discloses a method of manufacturing liquid-crystal devices, which method includes a spacer-forming step in which a spacer-forming material is furnished a plurality of times in discrete portions to the same places on a substrate and cured so as to form spacers which define an interval between a pair of substrates.

JP 2001-83528 A mentions that the required height of the spacer can be more easily achieved by having the amount of the spacer-forming material furnished the second and subsequent times be smaller than the amount of material furnished the first time.

Here, in a method of fabricating a three-dimensional structure by using an inkjet system to deposit droplets of ink, cure the ink so as to form a layer, and thereby build up successive layers of ink, depending on the properties of the ink (e.g., wetting ability) when it lands, a droplet of ink that has just landed may spread while the ink is wet, as a result of which the ink that has landed may protrude beyond the cured ink in the underlying layer.

To resolve this, the method described in JP 2005-205670 A adjusts the time when laser irradiation is carried out after the ink has landed, thereby adjusting ink spread while the ink is wet. By thus curing the ink within a fixed period of time after the ink has landed, the ink can be prevented from spreading while wet. Moreover, curing the ink immediately after it lands enables the film thickness to be increased; that is, the ink that has landed can be cured in a high aspect ratio state.

The method described in JP 2005-66530 A irradiates ink droplets that have been ejected from the nozzles and are in flight with pulsed light, thereby initiating the curing process as the droplets fall. This makes it possible to have the droplets land after attaining a higher viscosity, and enables curing to be effected in a high aspect ratio state.

However, the method of JP 2005-205670 A requires that laser irradiation be carried out within a short, fixed period of time after the ink has landed, whereas the method of JP 2005-66530 A requires that light irradiation be carried out during the time from when the ink is ejected until immediately after it lands.

As a result, the ink head and the light irradiating means must be placed in close proximity to each other, which limits the degree of freedom allowed of the apparatus and the method.

Moreover, because the light to effect curing is irradiated at a position which is close to the ink head, even if the irradiation timing is adjusted as described in JP 2005-66530 A, there is a possibility that nozzle clogging will arise when irradiation is repeatedly carried out.

Furthermore, although wet spreading of the ink can be prevented by gradually decreasing the liquid volume of the ink that is ejected as described in JP 2001-83528 A, there are limits to the size of the three-dimensional structure that can be formed in this way. Moreover, because the liquid volume is gradually decreased, the ink must be ejected a large number of times in order to form a high three-dimensional structure, which lowers the productivity.

SUMMARY OF THE INVENTION

It is therefore an object of the present invention to provide a method of fabricating a three-dimensional structure, which method resolves the above-described problems with the prior art and is able to fabricate at a high productivity three-dimensional structures having a high aspect ratio. Another object of the invention is to provide a method of manufacturing a substrate having spacers thereon by using such a three-dimensional structure fabricating method.

A method of fabricating a three-dimensional structure according to the invention comprises the steps of: depositing a droplet of curable ink on a substrate; curing the ink deposited on the substrate; and building up the ink in layers by repeatedly depositing a droplet of curable ink on the cured ink and curing the deposited ink, while doing at least one of a control of a contact angle between the droplet of ink to be deposited and cured ink at the landing position where the droplet of ink is to be deposited and a control of a volume of the droplet of ink to be deposited so as to satisfy the condition $d_n \leq d_{n-1}$, where $d_n$ represents the landing diameter of a droplet of ink to be deposited and $d_{n-1}$ represents the diameter of cured ink at a landing position where the droplet of ink is to be deposited.

A method of manufacturing a substrate having a spacer thereon according to the invention uses such a method of fabricating a three-dimensional structure to fabricate on the substrate a spacer as the three-dimensional structure through forming a plurality of spacer-forming material layers at a same place on the substrate by using a spacer-forming material as the ink.

DETAILED DESCRIPTION OF THE INVENTION

The method of fabricating three-dimensional structures according to the invention, and substrates having spacers thereon which are fabricated using the inventive method, are described in detail below based on the embodiments shown in the appended diagrams.

Figure 1:
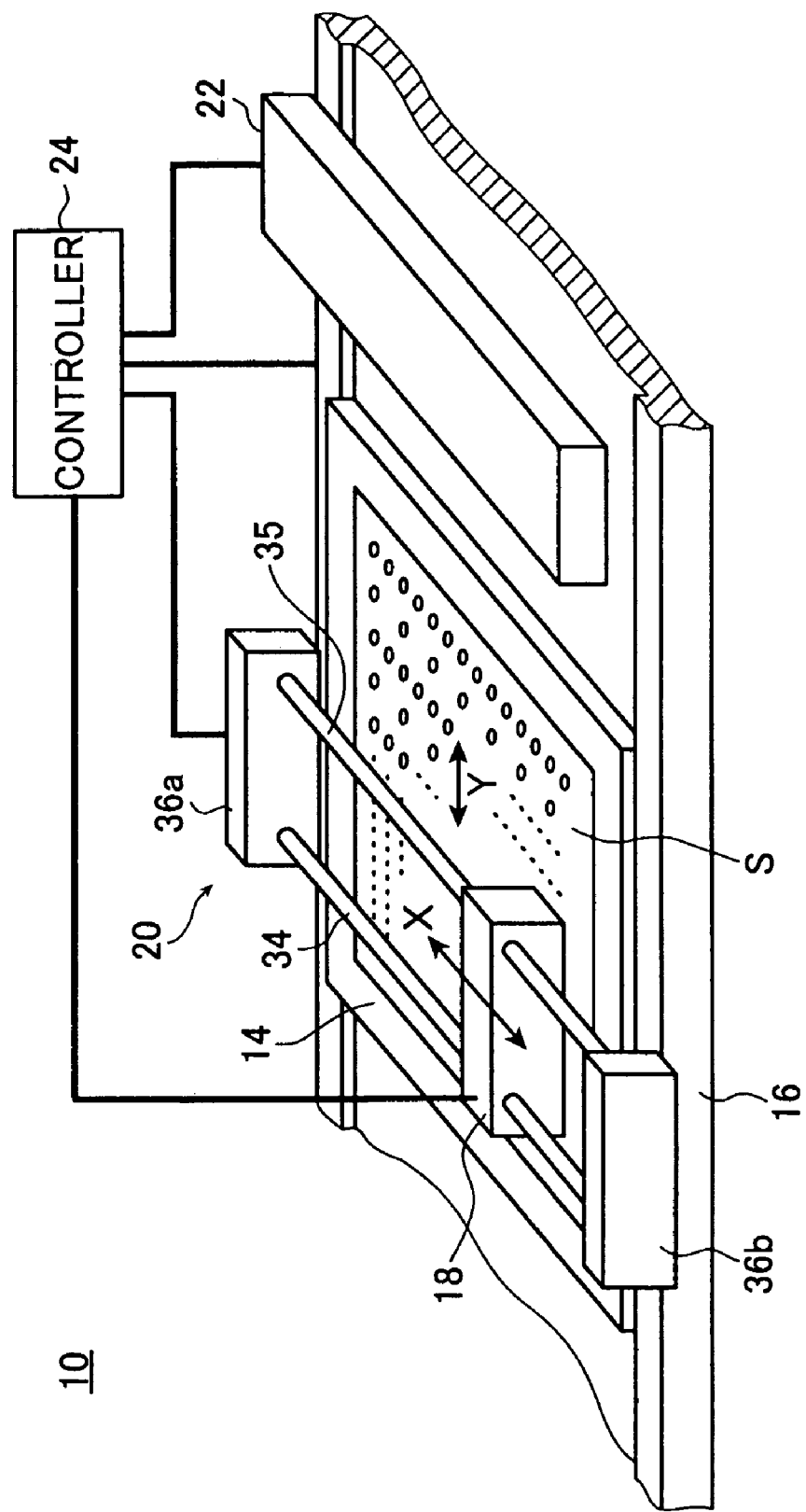
FIG. 1 is a schematic perspective view showing an apparatus for fabricating three-dimensional structures using the three-dimensional structure fabricating method of the present invention.

FIG. 1 is a schematic perspective view showing an apparatus for fabricating three-dimensional structures using the three-dimensional structure fabricating method of the present invention.

Referring to FIG. 1, a three-dimensional structure fabricating apparatus 10 has a support 14 for loading a substrate S having a shape of a flat plate, a support moving mechanism 16 for moving the support 14 in one direction, an inkjet head 18 for ejecting a curable ink (also referred to below as simply "ink") onto the substrate S, a head moving mechanism 20 for moving the inkjet head 18 in a direction orthogonal to the direction of movement by the support 14, an exposure unit 22 for exposing the ink that has landed on the substrate S to light, and a controller 24 for controlling the operation of the respective components.

Here, the substrate S is an impermeable plate-like member or film through which ink does not pass. Plate-like members that may be used as the substrate S include plate-like members formed of various materials, such as glass substrates, metal substrates and plastic substrates. Films that may be used as the substrate S include various types of plastic films, such as polyethylene terephthalate films, polybutylene terephthalate films, polycycloolefin films, biaxially oriented polypropylene films, polycarbonate films, polyamide films, polyvinyl chloride films, methacrylate-styrene resin films, polyimide films, silicone resin films and fluorocarbon resin films. The ink is a photocurable ink which cures when irradiated with light. For example, a radical polymerizable or cationically polymerizable photocurable monomer ink may be used.

The support 14 is a plate-like member on the surface which the substrate S is fixed. Here, the method of fixing the substrate S on the support 14 is not subject to any particular limitation. For example, the substrate S may be fixed in place by mechanically clamping the edges of the substrate S, the substrate S may be fixed in place by electrostatic adsorption, or the substrate S may be fixed to the surface of the support 14 by providing suction holes and aspirating air from the suction holes.

The support moving mechanism 16 is a mechanism for moving the support 14 in a direction parallel to the surface of the support 14 (the Y direction in FIG. 1). That is, the support moving mechanism 16 moves the support 14 in such a way as to keep the surface of the support 14 in the same flat plane.

Any of various transport mechanisms may be used as the support moving mechanism 16, including a belt transport mechanism, a linear transport mechanism, and a roller transport mechanism which moves the support 14 by means of a roller that grips the edge of the support 14.

The inkjet head 18 is a means for depositing droplets of ink on the substrate S, and is disposed so as to face the side of the support 14 on which the substrate S is supported.

The inkjet head 18 may be any of various types of inkjet heads, such as a piezoelectric, thermal, electrostatic actuator or electrostatic suction-type inkjet head. However, the use of a piezoelectric-type inkjet head which allows the liquid volume of ink deposited as droplets to be easily adjusted is preferred.

It is also preferable for the inkjet head 18 to be a multi-channel unit having a plurality of nozzles which deposit droplets of ink. By having the inkjet head 18 be a multi-channel unit, ink droplets can be deposited in a plurality of places at the same time.

The head moving mechanism 20, which has a drive screw 34, a guide rail 35, a driving and supporting member 36a and a supporting member 36b, moves the inkjet head 18 in a direction (direction X in FIG. 1) which is parallel to the surface of the support 14 and orthogonal to the direction in which the support 14 moves (Y direction).

The drive screw 34 and the guide rail 35 are both disposed so as to extend over the largest substrate S that can be used, from a left edge to a right edge thereof, in the direction of transport of the inkjet head 18 (direction X in FIG. 1).

The drive screw 34 is composed of a ballscrew and the like (not shown) which threadingly engages a thread portion (not shown) formed on the inkjet head 18 and, by rotating, causes the inkjet head 18 to move. The guide rail 35 passes through a throughhole formed in the inkjet head 18, and serves as a guide which keeps the orientation of the inkjet head 18 that moves with rotation of the drive screw 34 from changing.

The driving and supporting member 36a is provided at one ends of the drive screw 34 and the guide rail 35, and the supporting member 36b is provided at the other ends thereof. The driving and supporting member 36a and the supporting member 36b together support the drive screw 34 in a forward and reverse rotatable manner, and support the guide rail 35 in such a way that it does not move. The driving and supporting member 36a has a driving source (not shown) such as a motor which drives the drive screw 34. The driving and supporting member 36a and the supporting member 36b are both supported by a housing (not shown) of the three-dimensional structure fabricating apparatus.

The head moving mechanism 20 forward and reverse rotates the drive screw 34 with the driving and supporting member 36a, thereby reciprocally moving (scanning) the inkjet head 18 in the X direction (main scanning direction) while being guided by the guide rail 35.

The head moving mechanism 20 may have a plurality of guide rails for holding the orientation of the inkjet head 18, or may have another orientation holding means. The inkjet head 18 is moved while maintaining a given orientation such that the portion thereof which ejects ink droplets, i.e., the surface of the inkjet head 18 which delivers droplets of ink, faces the support 14.

The mechanism for moving the inkjet head 18 is not limited to the above-described head moving mechanism 20; that is, any of various suitable known moving mechanisms may be employed for the same purpose. For example, use may be made of an arrangement in which the drive screw is a rod-like member such as a guide rail, a guide wire is attached on both sides of the inkjet head in the X direction, and the inkjet head is made to move along the guide rail by taking up the guide wire on a reel in the direction of movement. Alternatively, movement may be effected with a timing belt instead of a guide wire, in which case a timing belt sprocket is used instead of a wire reel. Other mechanisms that may be used for this purpose include a rack-and-pinion mechanism, a self-propelled mechanism, and a linear motor.

The exposure unit 22 is a light-irradiating unit which shines light on the substrate S onto which drops of ink have been deposited by the inkjet head 18, and which is able to adjust the intensity of the irradiation used for exposing the ink. This exposure unit 22 is disposed so as to face the side of the support 14 on which the substrate S is supported, and so as to cover the support 14 from end to end in a direction parallel to the direction in which the inkjet head 18 moves.

So long as the exposure unit 22 is a light-emitting unit which emits light that cures the ink, use may be made of any of various light-emitting units, such as metal halide lamps, high-pressure mercury vapor lamps, LEDs, solid lasers, gas lasers and semiconductor lasers. The light emitted by the light-emitting unit may be light having any of various wavelengths, depending on the type of ink. For example, use may be made of ultraviolet light, visible light, infrared light or X-rays. Alternatively, depending on the type of ink, units that emit electromagnetic radiation, including light of various wavelengths and microwaves, may be employed as the exposure unit.

The intensity of the light (or electromagnetic radiation) emitted by the exposure unit 22 can be adjusted to various intensities by means of, for example, the strength of the supplied voltage and polarization based on the type of filter.

The controller 24 controls the operational parameters of the support moving mechanism 16, the inkjet head 18, the head moving mechanism 20 and the exposure unit 22, such as the transport velocity, distance and timing for the substrate S, the volume of ink delivered as individual droplets and the timing of droplet delivery, the movement velocity, distance and timing for the inkjet head 18, and the intensity and timing of light irradiation by the exposure unit 22.

The method of connection between the controller 24 and the various components is not subject to any particular limitation. Connection may be achieved with wires or may be wireless, so long as signal transmission and reception are possible.

Based on data that has been input for the three-dimensional structure to be fabricated, the controller 24 pre-calculates (i.e., calculates prior to starting the actual fabricating operation) the ink droplet volume and the conditions of the deposited ink for each layer.

First, for the first layer, the liquid volume $V_1$ of the ink necessary for achieving the planned ink diameter is calculated based on the contact angle $\theta_1$ between the drop of ink to be deposited and the substrate S.

For the n-th layer (2<n), the contact angle $\theta_n$ between the drop of ink to be deposited and the ink that has cured on the substrate S, more precisely, the cured ink at the landing position of the drop of ink to be deposited (which is referred to below as the "landing position ink") is calculated based on the curing conditions (e.g., transport velocity during exposure, light intensity) of the landing position ink and the properties of the ink.

Based on the calculated contact angle $\theta_n$, the liquid volume $V_n$ of the drop of ink to be deposited is calculated in such a way that the relationship between the landing diameter $d_n$ of the drop of ink to be deposited and the diameter $d_{n-1}$ of the landing position ink satisfies the condition $d_n \leq d_{n-1}$.

In addition, curing conditions for the deposited ink are also calculated so that the contact angle of the deposited ink with the ink to be deposited thereon becomes the optimal contact angle (e.g., such that the sum of the angle of the substrate S with the surface of the deposited ink and the contact angle is 90 degrees).

Methods for calculating the contact angle $\theta_n$, the liquid volume $V_n$ of the ink, and the ink curing conditions are described in detail later in the specification.

Figure 2:
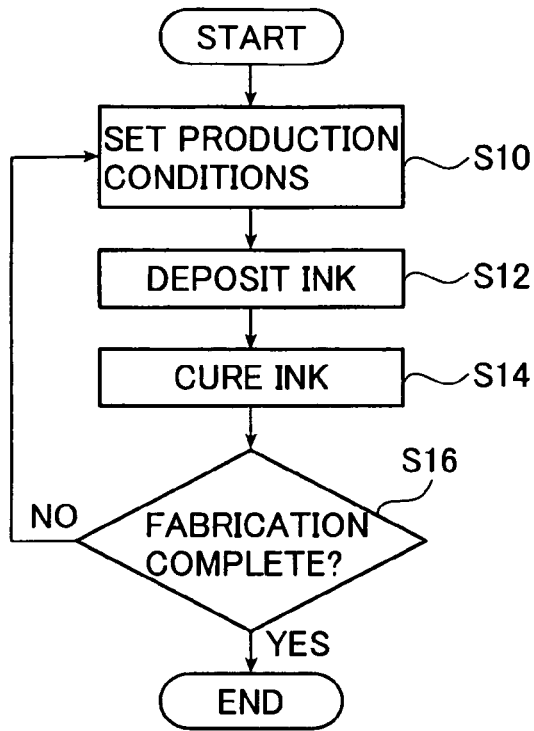
FIG. 2 is a flow diagram illustrating an embodiment of the inventive method of fabricating three-dimensional structures.

The inventive method of fabricating a three-dimensional structure is now described more fully by explaining the operations carried out using the three-dimensional structure fabricating apparatus 10 configured as described above. FIG. 2 is a flow diagram showing the steps in the method of fabricating a three-dimensional structure.

First, the substrate S is fixed in a given position on the support 14.

The support 14 on which the substrate S has been fixed is then transported in the Y direction by the support moving mechanism 16, thereby moving the substrate S to a position facing the inkjet head 18.

Next, the ejection timing, ink droplet volume and deposited ink curing conditions for the first layer which are pre-calculated by the controller based on data for the three-dimensional structure to be fabricated are read out and set (Step S10). Then, based on the deposition conditions that have been set, droplets of ink are deposited on the substrate S (Step S12).

Specifically, first, droplets of ink are deposited onto the substrate S at a position opposite from the inkjet head 18 while the inkjet head 18 is being moved in the X direction by the head moving mechanism 20. Based on the ejection timing calculated by the controller 24 using the three-dimensional structure data that has been input, the inkjet head 18 deposits, only at required positions on the substrate S, liquid volumes of ink that are based on the conditions which have been set.

The head moving mechanism 20 moves the inkjet head 18 from one edge of the substrate S to the other edge, and drops of ink are deposited over the entire region of the substrate S at positions opposite the region through which the inkjet head 18 moves, after which the support moving mechanism 16 moves the substrate S a fixed distance in the Y direction.

The head moving mechanism 20 then again moves the inkjet head 18 from one edge of the substrate S to the other edge, and drops of ink are deposited over the entire region of the substrate S at positions opposite the region through which the inkjet head 18 moves. When ink deposition has ended, the support moving mechanism 16 again moves the substrate S a fixed distance in the Y direction.

Ink deposition by the inkjet head 18 and transport of the substrate S a fixed distance by the support moving mechanism 16 are repeated in this way so as to deposit drops of ink in a predetermined pattern over the entire surface of the substrate S.

Once droplets of ink have been deposited over the entire surface of the substrate S, the ink that has been deposited onto the substrate S is cured (Step S14).

That is, the substrate S is transported by the support moving mechanism 16 to a position opposite the exposure unit 22. Next, while the substrate S is being transported at a predetermined velocity by the support moving mechanism 16, the exposure unit 22 shines light onto the substrate S at the position opposite thereto, thereby curing the ink on the substrate S.

The velocity at which the substrate S is transported by the support moving mechanism 16 and the intensity of light emitted by the exposure unit 22 are the transport velocity and light intensity that were set by the controller 24.

Once the ink deposited onto the substrate S has been cured, a decision is made as to whether the three-dimensional structures are complete or not (Step S16).

If the three-dimensional structures are not complete, that is, if it is decided that there is a need to again deposit drops of ink and form layers, the process returns to Step S10. On the other hand, if it is decided that the three-dimensional structures are complete, the process is brought to an end.

Because the foregoing explanation relates to the first layer, the process then returns to Step S10 and fabrication of the second layer is carried out.

First, the ejection timing, droplet volume of the ink to be deposited and the deposited ink curing conditions for the second layer (at the n-th repetition, the n-th layer, where 2<n) that have been pre-calculated by the controller based on the data for the three-dimensional structure to be fabricated are read out and set (Step S10).

The substrate S is then returned to the initial position, and droplets of ink are deposited by the inkjet head 18 onto the substrate S where ink has cured (Step S12).

Specifically, the liquid volume $V_n$ of ink is deposited as droplets from the inkjet head 18 onto the cured ink on the substrate S while the inkjet head 16 is being moved by the head moving mechanism 20.

The substrate S is then transported a fixed distance in the Y direction by the support moving mechanism 16, and the liquid volume $V_n$ of ink is again deposited as droplets by the inkjet head 16 onto the cured ink on the substrate S. Here, the liquid volume $V_n$ is the liquid volume $V_n$ at that position in the n-th layer which was set in Step S10.

In this way, ink deposition by the inkjet head 18 and transport of the substrate S a fixed distance by the support moving mechanism 16 are repeated, thereby depositing droplets of ink on the substrate S in a predetermined pattern (at the ejection timing which was set in Step S10).

Next, once the ink has been deposited as droplets in a predetermined pattern over the entire surface of the cured ink on the substrate S, the ink that has been deposited on (the cured ink on) the substrate S is cured (Step S14).

Specifically, as in Step S12, while the substrate S is being transported at a predetermined velocity by the support moving mechanism 16, the exposure unit 22 shines light onto the substrate S at the position opposite thereto, thereby curing the deposited ink. At this time, the velocity at which the substrate S is transported by the support moving mechanism 16 and the intensity of light emitted by the exposure unit 22 are the conditions that were set in Step S10.

Once the ink deposited onto the substrate S has been cured, a decision is made as to whether the three-dimensional structures are complete or not (Step S16).

If the three-dimensional structures are not complete, that is, if a decision is made that there is a need to again deposit ink and form layers, the process returns to Step S10, the ejection timing, liquid volume of ink to be deposited and deposited ink curing conditions for the next layer are read out and set, and the ink deposition and curing steps are repeated.

On the other hand, if it is decided that the three-dimensional structures are complete, the process is brought to an end.

The three-dimensional structure fabricating apparatus 10 repeats ink deposition and curing in a predetermined pattern as described above so as to build up layers of cured ink, thereby fabricating three-dimensional structures.

In this way, based on the contact angle $\theta_n$ between the ink to be deposited and the cured ink at the landing position where ink has been deposited, the droplet volume $V_n$ is calculated such that the landing diameter $d_n$ of the ink to be deposited does not become larger than the diameter $d_{n-1}$ of the cured ink, and ink in the droplet volume $V_n$ that has been calculated is deposited, thereby making it possible to prevent the ink to be deposited from having a larger landing diameter than the cured ink and spreading while wet, which in turn enables the deposited ink to be superimposed only on top of the cured ink.

Moreover, because an ink droplet volume such that the landing diameter does not become larger than the diameter of the cured ink can be suitably calculated, the liquid volume of ink deposited can be increased, enabling high three-dimensional structures to be fabricated with a small number of built-up layers.

In addition, by making the difference between the landing diameter $d_n$ and the diameter $d_{n-1}$ of the cured ink small, or having these diameters be the same, the ratio of decrease in the diameter of the three-dimensional structures can be made small or at least reduced, enabling layers to be built up and making it possible to fabricate three-dimensional structures having a high aspect ratio.

Methods for calculating the contact angle $\theta_n$ and the droplet volume $V_n$ are explained in detail below by way of examples. The contact angle $\theta_n$ and the droplet volume $V_n$ are calculated through computations by the controller 24.

First, an example of the method for calculating the contact angle $\theta_n$ between a drop of ink to be deposited and the already deposited, cured ink at the landing position is described.

Relationships, computed beforehand from experiments and the like, between the contact angle $\theta_n$ and the properties (e.g., composition, viscosity) of the ink to be deposited, the properties of the ink that has been cured on the substrate, and the degree of ink curing are already stored in the controller 24.

The controller 24, based on the type of cured ink and the type of ink to be deposited, computes the properties of the ink, and computes the degree of curing by cured ink from the exposure conditions using the exposure unit 22 (e.g., the transport velocity at the time of exposure, and the light intensity). The controller 24 then computes, based on the computed results and correspondence relationships that are stored in the controller 24, the contact angle $\theta_n$ between the ink to be deposited and the already deposited, cured ink at the landing position.

The method for computing the relationship between the degree of ink curing and the contact angle $\theta_n$ to be stored in the controller, is described more fully below together with a specific example.

In this example, a UV-curable monomer ink was used as the ink, a quartz substrate was used as the substrate, and a UV lamp (Spot-Cure SP-7, manufactured by Ushio Inc.) was used as the exposure unit. The UV-curable monomer ink was an ink that was formulated from a monomer, a photopolymerization initiator, a polymerization inhibitor, a surfactant and a pigment.

A cured ink film sample was prepared by first bar-coating the entire surface of the substrate with ink, then exposing the ink for a given period of time with the exposure unit.

Additional ink was then deposited as droplets onto the cured ink film sample.

Next, using a DM-700 contact angle meter (Kyowa Interface Science Co., Ltd.), the contact angle between the deposited ink and the cured ink film sample was measured by a contact-type liquid droplet method.

In addition, the above-described measurement was carried out for various exposure times by changing only the length of exposure with the exposure unit.

Figure 3:
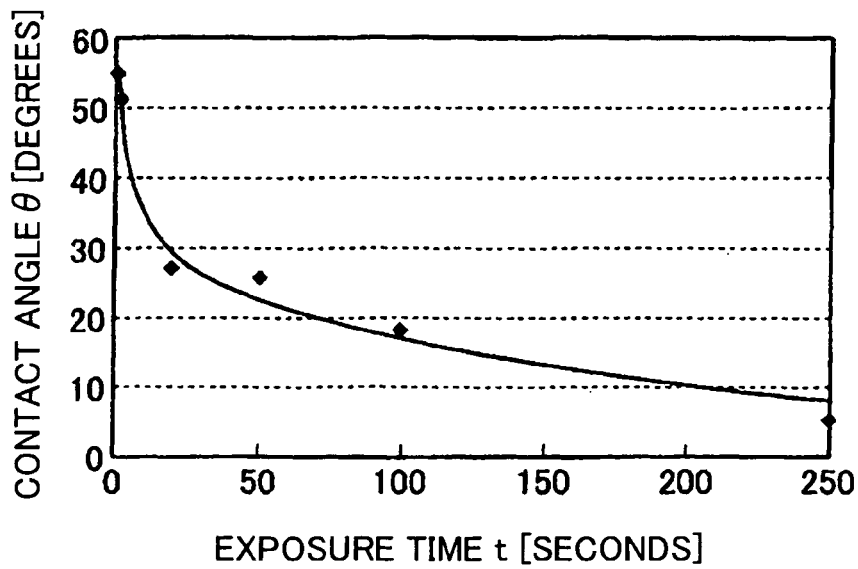
FIG. 3 is a graph illustrating the relationship between the exposure time and the contact angle.

The measured results are shown in FIG. 3. In FIG. 3, the abscissa represents the exposure time (seconds), and the ordinate represents the contact angle (degrees).

Referring to FIG. 3, it is apparent that changing the exposure time results in a change in the contact angle between the deposited ink and the cured ink film sample. That is, the contact angle between the drops of deposited ink and the cured ink was found to change with the exposure time. Specifically, depending on the exposure time, the contact angle changes from 5° to 55°.

As shown in FIG. 3, by measuring the relationship between the contact angle and the exposure time for each set of exposure conditions and for each ink used and storing the results in the controller 24, the contact angle can be computed from the various conditions.

Next, an example of the method for computing the droplet volume $V_n$ of the liquid to be deposited is described.

Figure 4:
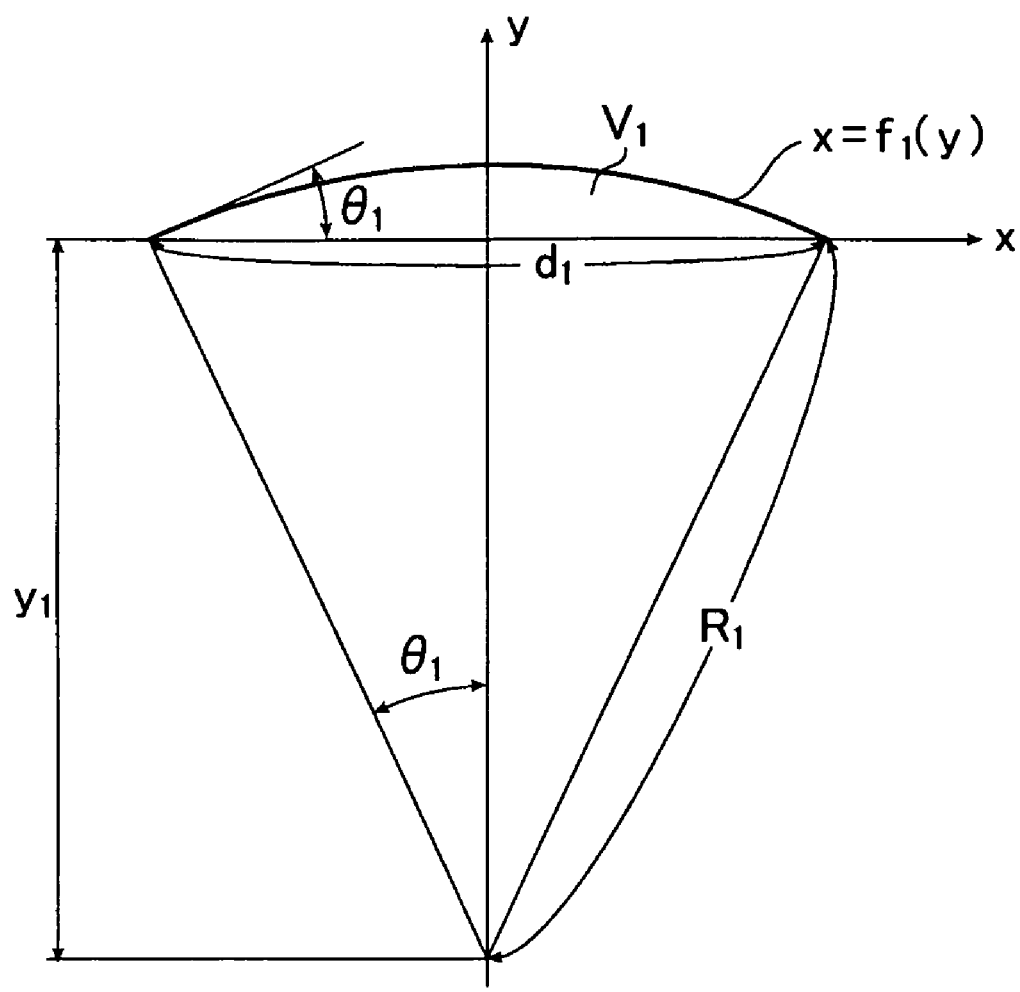
FIG. 4 is a schematic diagram showing a droplet of ink that has been deposited on a substrate.
Figure 5:
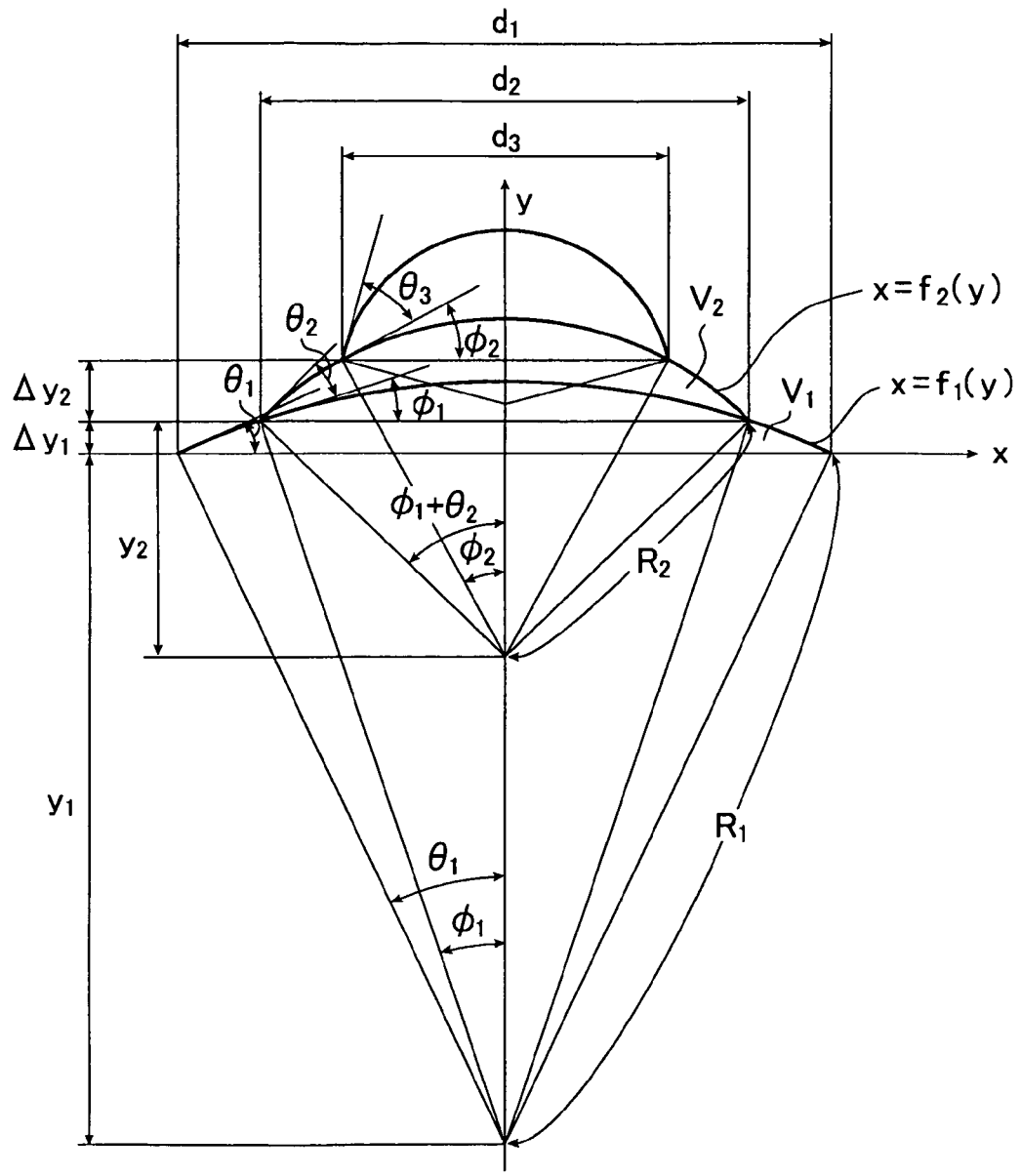
FIG. 5 a schematic diagram showing a fresh droplet of ink that has been deposited on cured ink.

FIG. 4 is a schematic diagram showing a droplet of ink that has been deposited on a substrate, and FIG. 5 is a schematic diagram showing a droplet of ink that has been deposited on cured ink.

First, the ink that is delivered as droplets and lands on the substrate in Step S12 (i.e., the ink that lands directly on the substrate, also referred to below as the "first ink droplet") is modeled such that the deposited ink has a shape which, as shown in FIG. 4, is in the shape of a section cut from a sphere having a radius of curvature R1. The x-axis (the axis parallel to the substrate) and the y-axis (the axis which is perpendicular to the substrate and passes through the center of the ink), which meet at, as the origin, the center of the plane of contact between the ink and the substrate shown in FIG. 4, serve as the axes for the present model shape, and differ from the X direction and Y direction shown in above-described FIG. 1.

The modeled first ink droplet has a landing diameter $d_1$, a contact angle $\theta_1$ between the substrate and the first ink droplet, and a volume $V_1$. The distance from the center of the sphere delineating the ink surface to the substrate is $y_1$.

Defining the various dimensions of the first ink droplet in this way, the cross-sectional profile of the first ink droplet can be represented by the following Formula (1).

$$x = \pm\sqrt{R_1^2 - (y+y_1)^2}, \text{ where } y \geq 0 \tag{1}$$

In Formula (1), $Y_1$ and $R_1$ are obtained as follows (Formula (2)).

$$y_1 = \frac{d_1}{2\tan\theta_1}, R_1 = \frac{d_1}{2\sin\theta_1} \tag{2}$$

Based on the above, the volume $V_1$ can be expressed as follows (Formula (3)).

$$\begin{aligned} V_1 &= \pi \int_0^{R_1-y_1} \{f(y)\}^2 dy \\ &= \pi\left(\frac{2}{3}R_1^3 - y_1 R_1^2 + \frac{y_1^3}{3}\right) \\ &= \pi d_1^3 \frac{(1-\cos\theta_1)(2+\cos\theta_1)}{24\sin\theta_1(1+\cos\theta_1)} \end{aligned} \tag{3}$$

$V_1$ is thus a function of $d_1$ and $\theta_1$.

Next, the state of ink droplets deposited onto cured ink is modeled as shown in FIG. 5. FIG. 5 shows three superimposed ink droplets on the substrate. A case is described below in which, after an $n-1^{th}$ ink droplet has been deposited and cured to form a layer, an $n^{th}$ ink droplet is deposited thereon. That is, the case described below is one in which, after the $n-1^{th}$ ink droplet has been cured, the $n^{th}$ ink droplet is deposited thereon.

First, when the $n^{th}$ ink droplet that has been delivered to and made to land on top of the cured $n-1^{th}$ ink droplet is modeled in the shape of a section cut from a sphere, the cross-sectional profile of the $n^{th}$ ink droplet can be expressed by Formula (4) below.

$$f_n(y) = \pm\sqrt{R_n^2 - \left(y + y_n - \sum_{k=1}^{N-1}\Delta y_k\right)^2}, \text{ where } y \geq 0 \tag{4}$$

The values $y_n$, $dy_n$ and $R_n$ in Formula (4) can be expressed by, respectively, Formulas (5) to (7) below. And $\Phi_{n-1}$, which is the angle between a tangent on the surface of the $n-1^{th}$ ink droplet, at a point of contact between the surface of the $n^{th}$ ink droplet and the $n-1^{th}$ ink droplet, and a plane which is parallel to the surface of the substrate, can be expressed by Formula (8) below.

$$y_n = \frac{d_n}{2\tan(\phi_{n-1} + \theta_n)} \tag{5}$$

$$\Delta y_n = R_n \cos\phi_n - y_n \tag{6}$$

$$R_n = \frac{d_n}{2\sin(\phi_{n-1} + \theta_n)} \tag{7}$$

$$\phi_{n-1} = \sin^{-1}\frac{d_n}{2R_{n-1}} \tag{8}$$

Using the relationships in above Formulas (4) to (8), the volume $V_n$ can be expressed in the manner of Formula (9) below.

$$V_n = \pi \left[ \int_0^{R_n - y_n} \left\{ f_n\left(y + \sum_{k=1}^{n-1} \Delta y_k\right) \right\}^2 dy - \int_0^{R_{n-1} - y_{n-1}} \left\{ f_{n-1}\left(y + \sum_{k=1}^{n-1} \Delta y_k\right) \right\}^2 dy \right]$$

$$= \pi \left[ \int_0^{R_n - y_n} \{R_n^2 - (y + y_n)^2\} dy - \int_0^{R_{n-1} - y_{n-1}} \{R_{n-1}^2 - (y + y_{n-1} + \Delta y_{n-1})^2\} dy \right]$$

$$= \pi \left\{ \frac{2}{3}(R_n^3 - R_{n-1}^3) - y_n R_n^2 + (y_{n-1} + \Delta y_{n-1}) R_{n-1}^2 + \frac{y_n^3}{3} - \frac{(y_{n-1} + \Delta y_{n-1})^3}{3} \right\}$$

$$V_n = \frac{24}{\pi} \left\{ d_n^3 \left( \frac{2 - 3\cos(\phi_{n-1} + \theta_n) + \cos^3(\phi_{n-1} + \theta_n)}{\sin^3(\phi_{n-1} + \theta_n)} - \frac{1}{\tan^3 \phi_{n-1}} \right) - d_n \frac{3d_{n-1}^2}{\tan \phi_{n-1} \sin^2 \theta_{n-1}} - \frac{2d_{n-1}^3}{\sin^3 \theta_{n-1}} \right\}$$

(9)

As shown in Formula (9), $V_n$ can be expressed in terms of $d_n$, $d_{n-1}$, $\theta_n$, $\theta_{n-1}$ and $\Phi_{n-1}$.

Here, because $d_{n-1}$, $\theta_{n-1}$, and $\Phi_{n-1}$ are values which relate to the n-1$^{th}$ ink droplet, they are fixed at the time that the n$^{th}$ ink droplet is deposited. The properties of the ink to be deposited as the n$^{th}$ ink droplet and the properties and curing conditions of the n-1$^{th}$ ink droplet are fixed at the time the n$^{th}$ ink droplet is deposited. Hence, $\theta_n$ also is fixed at the time that the n$^{th}$ ink droplet is deposited.

Therefore, at the time that the n$^{th}$ ink droplet is deposited, the only variables in Formula (9) are $d_n$ and $V_n$.

From the above, using Formula (9), the controller 24 is able to compute the volume $V_n$ of the n$^{th}$ ink droplet such that $d_n \leq d_{n-1}$.

In this way, by depositing an ink droplet of the computed droplet volume $V_n$, it is possible to deposit an ink droplet on the cured ink without the deposited droplet protruding beyond the cured ink.

Also, by using Formula (9) to compute the droplet volume $V_n$ for $d_n = d_{n-1}$, the volume of the liquid droplet can be maximized without the ink protruding beyond the underlying cured ink. That is, the maximum volume ink droplet that enables fabrication without protrusion of the superimposed ink beyond the cured ink below can be deposited.

In the embodiment described above, the liquid volume of an ink droplet was computed from the landing diameter. However, the invention is not limited in this regard.

For example, it is also possible, by substituting a desired or selected ink droplet volume for $V_n$ in Formula (9), to detect whether ink of the droplet volume can in fact be deposited or not. In cases where ink of the droplet volume that has been selected is incapable of being deposited (i.e., in cases where the deposited ink protrudes while wet beyond the underlying cured ink), it is possible in this way, by reducing the droplet volume, to detect the liquid volume of ink droplets that are capable of being deposited.

For example, if the contact angle $\theta_1$ between the substrate and the ink is 20° and the volume $V_1$ of the first ink droplet is 10 pL, we find that $R_1$ is 96 μm and $d_1$ is 66 μm.

If the contact angle $\theta_2$ between the second ink droplet to be deposited and the cured first ink droplet at the landing position of the second ink droplet is 30° and the volume $V_2$ of the second ink droplet is 10 pL, the landing diameter $d_2$ of the second ink droplet can be computed from Formula (9) to be 55 μm. Here, because $d_2 < d_1$, it is apparent that the second ink droplet is capable of landing without protruding beyond the first ink droplet.

In this way, by using Formula (9) and knowing the contact angle θ and the ink droplet volume $V_n$, a decision can be made as to whether a liquid ink droplet can be deposited on cured ink to form a layer.

In the above-described embodiment, by satisfying the condition $d_n \leq d_{n-1}$, the ink to be deposited is prevented from protruding while wet beyond the already deposited ink. However, taking into account the error a (e.g., 2 μm) in the landing position due to the inkjet head, it is preferable to satisfy the condition $d_n \leq d_{n-1} + a$.

When the droplet volume $V_n$ is computed so as to satisfy the condition $d_n \leq d_{n-1} + a$, the volume of liquid that can be deposited as an ink droplet decreases, but the deposited ink can be more reliably prevented from protruding beyond from the cured ink.

Also, as described above, it is possible to change (adjust) the contact angle θ by means of the exposure conditions.

It is thus desirable for the controller to adjust the exposure conditions, such as the support transporting velocity and the intensity of light emitted by the exposure unit, when the deposited ink droplet is cured.

By thus adjusting the exposure conditions, and by adjusting the contact angle θ with the ink droplet to be deposited next, the ink droplet to be deposited next can be made larger.

Here, the three-dimensional structures may be fabricated by computing immediately in advance the relationship between the contact angle θ and the droplet volume $V_n$ that will satisfy the condition $d_n \leq d_{n-1}$, calculating, based on the results of such computations, the production conditions (ejection conditions, curing conditions) for each of the computed results, and using production conditions which correspond to the relationship between the contact angle $\theta_n$ and the droplet volume $V_n$.

By computing the correspondence relationships immediately in advance in this way, it is possible to monitor the exposure intensity, calculate a more accurate contact angle $\theta_n$ and adjust the droplet volume $V_n$ accordingly, or to monitor the ink temperature, calculate a more accurate droplet volume $V_n$ and adjust the contact angle $\theta_n$ accordingly.

The controller may be installed either inside the apparatus or outside the apparatus.

The three-dimensional structure fabricating apparatus may also have a liquid-repelling treatment unit which subjects the ink surface to liquid-repelling treatment.

Figure 6:
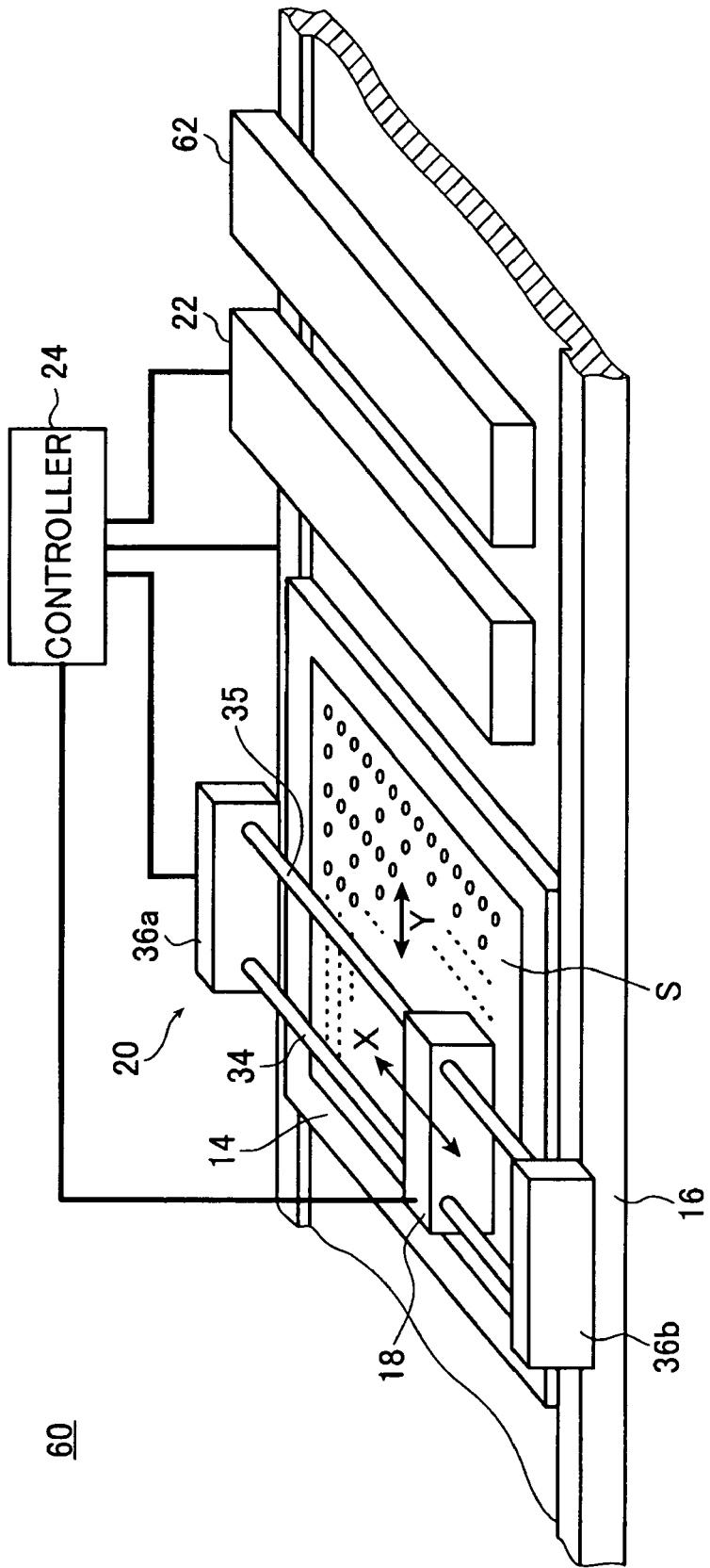
FIG. 6 is a simplified perspective view showing a three-dimensional structure fabricating apparatus adapted for use in another embodiment of the invention.

FIG. 6 is a simplified perspective view showing a three-dimensional structure fabricating apparatus adapted for use in another embodiment of the three-dimensional fabricating method of the invention.

The three-dimensional structure fabricating apparatus 60 shown in FIG. 6 has a configuration which, aside from having a liquid-repelling treatment unit 62, is the same as the configuration of the three-dimensional structure fabricating apparatus shown in FIG. 1. Therefore, in FIG. 6, like features are indicated by like symbols, and explanations of such features are omitted below. The following explanation focuses on those features which are distinctive to the present three-dimensional structure fabricating apparatus 60.

As shown in FIG. 6, the three-dimensional structure fabricating apparatus 60 has a support 14, a support moving mechanism 16, an inkjet head 18, a head moving mechanism 20, an exposure unit 22, a liquid-repelling treatment unit 62 and a controller 24 which controls the operation of each component.

The liquid-repelling treatment unit 62 subjects the surface of deposited and cured ink to liquid-repelling treatment. This liquid-repelling treatment unit 62 is disposed so as to face the side of the support 14 which supports the substrate S, and to cover the support 14 from one edge to the other edge in a direction parallel to the direction in which the inkjet head 18 moves. Moreover, the liquid-repelling treatment unit 62 is disposed on the opposite side of the exposure unit 22 from that which faces the inkjet head 18, and in such a way as to be separated by a given interval from the exposure unit 22.

Any of various units which carry out liquid-repelling treatment may be used as the liquid-repelling treatment unit 62. Suitable examples include methods which use a process such as spin coating or vapor deposition to apply a fluorocarbon resin material such as polytetrafluoroethylene (PTFE) over the entire surface of the substrate that passes by, dry the applied material, and thereby form a liquid-repelling side on both the substrate surface and the ink surface. Alternatively, use may be made of the fluorocarbon resin treatment method described in JP 2000-17091 A, or of a method for carrying out liquid-repelling treatment using ultra-water-repelling treatment described in, for example, "Influence of Ar ion implantation on ultra-water repellency of fluorocarbon resins" (Preprints of $15^{th}$ Symposium on Ion Implantation Surface Treatment).

The liquid-repelling treatment unit 62 configured as described above subjects the surface of ink on a substrate S, which is transported by the support moving mechanism 16 and passes by a position opposite the liquid-repelling treatment unit 62, to liquid-repelling treatment.

By subjecting the surface of cured ink to liquid-repelling treatment in this way, the contact angle between the ink which has been cured and the ink which is to be deposited thereon can be adjusted. By thus adjusting the contact angle, it is possible to adjust the droplet volume of ink that can be deposited.

Moreover, it is possible to have the liquid-repelling treatment unit 62 either carry out or not liquid-repelling treatment, or adjust the degree of liquid-repelling treatment, depending on the cured ink. By selectively carrying out liquid-repelling treatment, the volume of the liquid droplet capable of being deposited can be adjusted.

Moreover, the inkjet head, through adjustment of the driving waveform and adjustment of the liquid volume delivered at one time, preferably adjusts the ink droplet volume to the desired liquid delivery volume. Adjustment of the driving waveform can be carried out by ordinary inkjet art involving, for example, the applied voltage, pulse width and pull-push timing. Alternatively, particularly in the case of a piezoelectric inkjet head, the droplet volume may be suitably adjusted by the driving waveform.

The inkjet head preferably adjusts, by means of the number of ink droplets delivered, the ink droplet volume so that the desired volume of liquid is deposited. For example, by depositing an ink droplet then depositing another droplet of ink at the same position without allowing the first deposited droplet to cure, the liquid volume of ink deposited can be increased.

It is possible in this way, by making adjustments using the number of liquid droplets, to average out shifts in the droplet landing positions.

In the earlier described three-dimensional structure fabricating apparatus 10, the ink deposited from the inkjet head was of one type. However, the invention is not limited in this regard. If necessary, a plurality of inks of differing properties may be deposited as droplets from the inkjet head. If the ink to be deposited can be selected in this way, adjustment of the contact angle is possible even by changing the type of ink to be deposited.

In this case, a plurality of inkjet heads may be provided so that the different types of inks can be delivered separately by each inkjet head, or a single ink selected from a plurality of inks may be delivered using a single inkjet head.

The three-dimensional structure fabricating apparatus 10 described above is an apparatus having a single ink delivery unit (inkjet head 18 and head moving mechanism 20) and one exposure unit 22, although the invention is not limited in this regard.

Figure 7:
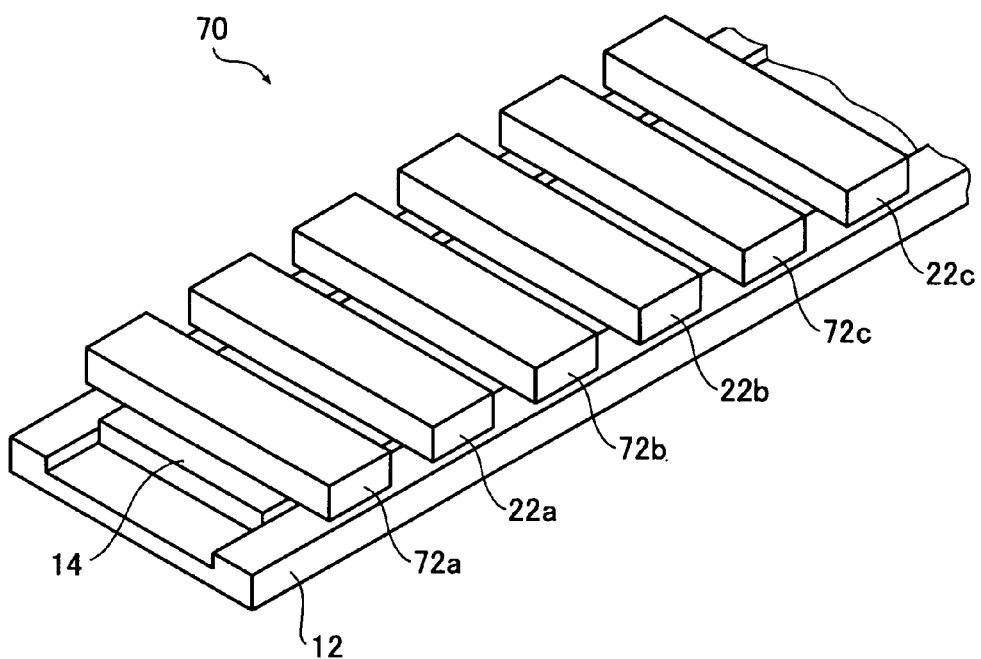
FIG. 7 is a schematic view showing a three-dimensional structure fabricating apparatus adapted for use in yet another embodiment of the invention.

FIG. 7 is a schematic view showing another three-dimensional structure fabricating apparatus adapted for use in the present invention.

Referring to FIG. 7, the three-dimensional structure fabricating apparatus 70 has a support 14, a support moving mechanism 16, first, second and third ink delivery units 72a, 72b and 72c, and first, second and third exposure units 22a, 22b and 22c.

Here, the three ink delivery units 72a, 72b and 72c are each composed of the inkjet head 18 and the head moving mechanism 20 of the three-dimensional structure fabricating apparatus 10 described above. These respective components have the same configurations as the earlier-described inkjet head 18 and head moving mechanism 20.

The three-dimensional structure fabricating apparatus 70 has arranged, on the side of the support moving mechanism 16 where the support 14 is mounted, in the following order from one direction of transport of the support 14 toward the other direction: the first ink delivery unit 72a, the first exposure unit 22a, the second ink delivery unit 72b, the second exposure unit 22b, the third delivery unit 72c, and the third exposure unit 22c. That is, the ink delivery units and the exposure units are alternately arranged.

The three-dimensional structure fabricating apparatus 70 transports in one direction, by means of the support moving mechanism 16, the support 14 on which the substrate S is mounted, thereby causing the support 14 to pass by, in order, the first ink delivery unit 72a, the first exposure unit 22a, the second ink delivery unit 72b, the second exposure unit 22b, the third ink delivery unit 72c and the third exposure unit 22c. In this way, after ink has been deposited onto the substrate S by the first ink delivery unit 72a, the deposited ink can be cured at the first exposure unit 22a. Next, ink can be deposited onto the cured ink on the substrate S at the second ink delivery unit 72b, and the ink thus dispensed can be cured at the second exposure unit 22b. Finally, at the third ink delivery unit 72c, ink can again be deposited onto the cured ink on the substrate S, and the ink thus deposited can be cured at the third exposure unit 22c.

By thus providing a plurality of ink delivery units and exposure units, and alternately arranging the ink delivery units and the exposure units, it is possible to fabricate three-dimensional structures composed of a plurality of superimposed inks by merely transporting the substrate in one direction.

The number of ink delivery units and exposure units is not subject to any particular limitation. Thus, the three-dimensional structure fabricating apparatus may be configured so as to have two of each of these units, or four or more of each. In a case where a plurality of ink delivery units and exposure units are provided, and the substrate is back-and-forth in a reciprocating manner, by arranging a pair of units composed of a mutually neighboring ink delivery unit and exposure unit on not only the forward path, but also the return path, and repeatedly carrying out ink deposition and curing, it is similarly possible to build up the ink in layers. Also, by providing one more ink delivery unit than the number of exposure units so that an ink delivery unit is located at both the starting end and the finishing end of the transport path, the ink can be placed in a deposited state when it passes the exposure unit on both the forward and return paths, enabling three-dimensional structures to be efficiently fabricated.

The above-described three-dimensional structure fabricating apparatus and method may be employed as an apparatus and method for fabricating spacers (as the three-dimensional structures). As used herein, "spacers" refer to raised elements disposed between one substrate and another substrate for maintaining a fixed gap between a pair of substrates which hold therebetween liquid crystals that have been enclosed with a given orientation.

Figure 8:
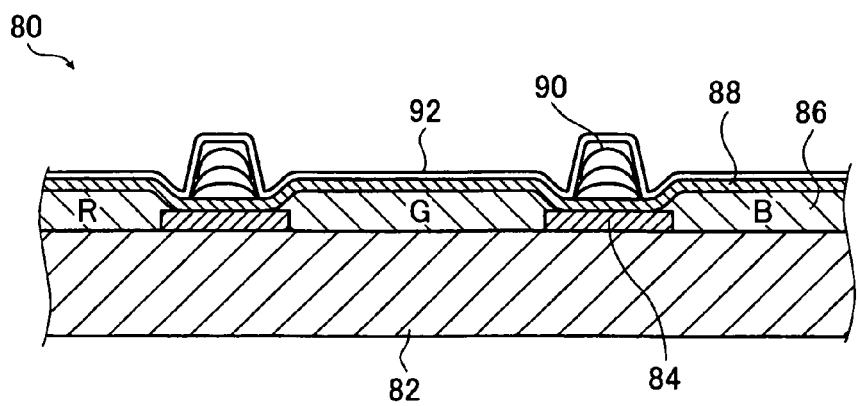
FIG. 8 is a sectional view showing the construction of a substrate with spacers thereon fabricated by the method of the invention.

FIG. 8 is a schematic cross-sectional diagram showing the construction of a substrate with spacers thereon.

The substrate with spacers 80 is a substrate used in liquid crystal display devices, and is composed of a transparent substrate 82, a black matrix 84, color filter pixels 86, a transparent electrode 88, spacers 90 and an alignment layer 92.

The transparent substrate 82 is a transparent, plate-like member.

The black matrix 84 is a lattice-like light-shielding film formed on the transparent substrate 82.

The color filter pixels 86 are filters in the respective colors of red (R), green (G) and blue (B) which are disposed so as to fill openings in the lattice formed by the black matrix 84. The color filter pixels 86 are arranged such that a filter of one color is disposed at each opening.

The transparent electrode 88 is formed on top of the black matrix 84 and the color filter pixels 86.

The spacers 90 are disposed on a top surface of the transparent electrode 88 above the black matrix 84, and serve to maintain a fixed interval between the transparent substrate 82 and a substrate placed over the transparent substrate 82 (on the color filter 86 side thereof). The spacers 90 are formed by building up ink in layers using the above-described three-dimensional structure fabricating apparatus.

The alignment layer 92 is formed over the entire surface of the spacers 90 and the transparent electrode 88.

In a substrate with spacers 80 configured as described above, by using the inventive three-dimensional structure fabricating apparatus and method to fabricate the spacers 90, spacers having a high aspect ratio and a high shape accuracy can be fabricated.

Moreover, as described above, spacers having a high aspect ratio can be fabricated with a small number of ink layers. This makes it possible to prevent the spacers from protruding out over the color filters, thus enabling the color filters to be arranged to a high density.

In this way, high aspect ratio spacers can be fabricated in a short time, enabling the advantageous manufacture of high-performance liquid crystal displays having few defects such as display irregularities.

In addition, the black matrix of the substrate with spacers can also be fabricated using a three-dimensional structure fabricating apparatus and method to build up successive layers of ink by repeatedly depositing ink droplets and curing the deposited ink.

The spacers 90 are preferably fabricated so that, letting a position at 90% of the spacer height be the top end of the lateral edge, the angle $\theta_s$ between the substantially trapezoidal side edge and the base satisfies the condition $30°<\theta_s<90°$. By adjusting the droplet volume and also the contact angle so that the spacers satisfy the above condition, it is possible to fabricate spacers having a high strength which are not readily subject to shape deformation.

In cases where the spacers are fabricated as three-dimensional structures, a curable resin containing an unsaturated compound and a initiator may be used as the ink (i.e., the liquid deposited as droplets). Illustrative examples of the unsaturated compound include, in a radical polymerization system, unsaturated compounds such as acrylic and methacrylic compounds; and in a cationic polymerization system, unsaturated compounds such as epoxy, oxetane and vinyl ether compounds.

Illustrative examples of initiators include, in a radical polymerization system, benzophenone, thioxanthone, acetophenone and acylphosphine initiators; and in a cationic polymerization system, iodonium salts and sulfonium salts.

Although embodiments of the method of fabricating three-dimensional structures according to the present invention have been described in detail above for the purpose of illustration, those skilled in the art will appreciate that various modifications and variations are possible without departing from the scope and spirit of the invention.

For example, in the three-dimensional structure fabricating apparatuses described above, a shuttle system which moves the inkjet head over the substrate with a head moving mechanism was employed, although the invention is not limited in this regard. For example, the inkjet head may have a line-type construction capable of depositing ink droplets over the entire region of the substrate in the direction orthogonal to the direction of substrate movement. Such an arrangement enables droplets of ink to be deposited over the entire surface of the substrate by transporting the substrate in only one direction without moving the inkjet head. In another possible arrangement, droplets of ink are deposited over the entire surface of the substrate by moving the inkjet head in two dimensions (the X and Y directions) while keeping the substrate fixed. In such a case, the exposure unit must also be provided with a moving mechanism and caused to move.

The color of the ink is not subject to any particular limitation. The ink may be of any color, and may even be colorless.

Photocurable inks were used in the above-described embodiments, but the invention is not limited in this regard. Alternatively, may be made of, for example, heat-curable inks or wax inks.

In cases where a photocurable ink is not used as the ink, a curing unit which irradiates the ink with ink-curing energy should be used in place of the exposure unit.

The substrate is not limited to a smooth, plate-like member, and may instead be a substrate having an uneven surface shape. In cases where the above-described substrate with spacers is to be fabricated, for example, the inventive method can be used to create three-dimensional structures on the substrate having an uneven surface shape.

What is claimed is:

1. A method of fabricating a three-dimensional structure, the method comprising the steps of:
   depositing a droplet of curable ink on a substrate;
   curing the ink deposited on the substrate; and
   building up the ink in layers by repeatedly depositing a droplet of curable ink on the cured ink and curing the deposited ink, while doing at least one of a control of a contact angle between the droplet of ink to be deposited and cured ink at the landing position where the droplet of ink is to be deposited and a control of a volume of the droplet of ink to be deposited so as to satisfy the condition $d_n \leq d_{n-1}$, where $d_n$ represents the landing diameter of a droplet of ink to be deposited and $d_{n-1}$ represents the diameter of cured ink at a landing position where the droplet of ink is to be deposited, wherein the building up step uses the following formula to calculate the contact angle $\theta_n$ or the droplet volume $V_n$ $$V_n = \frac{24}{\pi} \left\{ d_n^3 \left( \frac{2 - 3\cos(\phi_{n-1} + \theta_n) + \frac{\cos^3(\phi_{n-1} + \theta_n)}{\sin^3(\phi_{n-1} + \theta_n)} - \frac{1}{\tan^3 \phi_{n-1}}}{} \right) - d_n \frac{3d_{n-1}^2}{\tan\phi_{n-1}\sin^2\theta_{n-1}} - \frac{2d_{n-1}^3}{\sin^3\theta_{n-1}} \right\}$$

where
- $\theta_n$ is the contact angle between the droplet of ink to be deposited and the cured ink at the landing position of the droplet of ink to be deposited,
- $\theta_{n-1}$ is the contact angle between the cured ink at the landing position of the droplet of ink to be deposited and a body on which the cured ink at the landing position of the droplet of ink to be deposited has landed,
- $\Phi_{n-1}$ is an angle between a tangent on the surface of the cured ink at the landing position where the droplet of ink is to be deposited, at a point of contact between the surface of the droplet of ink to be deposited and the cured ink at the landing position of the droplet of ink to be deposited, and a plane which is parallel to the surface of the substrate, and
- $V_n$ is the volume of the droplet of ink to be deposited.

2. The method of claim 1, wherein the building up step uses a pre-calculated relationship of the contact angle between the droplet of ink to be deposited and cured ink at the landing position where the droplet of ink is to be deposited with the volume of the droplet of ink to be deposited which satisfies the condition $d_n \leq d_{n-1}$ and uses pre-calculated ejection conditions and curing conditions that are based on said relationship to perform at least one of a control of the contact angle between the droplet of ink to be deposited and cured ink at the landing position where the droplet of ink is to be deposited and a control of the volume of the droplet of ink to be deposited.

3. The method of claim 1, wherein the building up step calculates and controls the volume of the droplet of ink to be deposited, based on the contact angle between the droplet of ink to be deposited and cured ink at the landing position where the droplet of ink is to be deposited, so as to satisfy the condition $d_n \leq d_{n-1}$.

4. The method of claim 1, wherein the building up step calculates and controls the contact angle between the ink to be cured and the droplet of ink to be deposited, based on the volume of the droplet of ink to be deposited, so as to satisfy the condition $d_n \leq d_{n-1}$.

5. The method of claim 1, wherein the building up step satisfies the condition $d_n \leq d_{n-1} + a$, where a represents the landing error of the droplet of ink to be deposited.

6. The method of claim 1, wherein the ink is of a type that cures on exposure to electromagnetic radiation containing visible light or invisible light;
- the curing step cures the ink by exposing the ink to electromagnetic radiation; and
- the building up step cures the ink by exposing the ink to electromagnetic radiation, and controls the contact angle based on properties of the ink and on the duration and intensity of irradiation that was directed at the ink cured just previously.

7. The method of claim 1, further comprising the step of:
- subjecting a surface of the ink that was cured in the curing step to liquid-repelling treatment;
- wherein the building up step cures the deposited droplet of ink, subjects the surface of the cured ink to liquid-repelling treatment, and then controls the contact angle based on properties of the ink subjected to liquid-repelling treatment.

8. The method of claim 1, wherein the building up step uses a piezoelectric inkjet head to deposit the droplet of ink, and uses a waveform of a driving voltage applied to a piezoelectric element of the piezoelectric inkjet head to adjust the volume of the droplet of ink to be deposited.

9. The method of claim 1, wherein the building up step adjusts the volume of ink deposited by varying the number of times an ink droplet is deposited.

10. The method of claim 1, wherein a spacer-forming material is used as the ink to fabricate a spacer as the three-dimensional structure.

11. A method of manufacturing a substrate having a spacer thereon, using the method of claim 1 to fabricate on the substrate a spacer as the three-dimensional structure through forming a plurality of spacer-forming material layers at a same place on the substrate by using a spacer-forming material as the ink.

* * * * *